March 22, 1960    F. C. COREY ET AL    2,929,096
POULTRY PROCESSING EQUIPMENT
Original Filed June 27, 1955    3 Sheets-Sheet 1
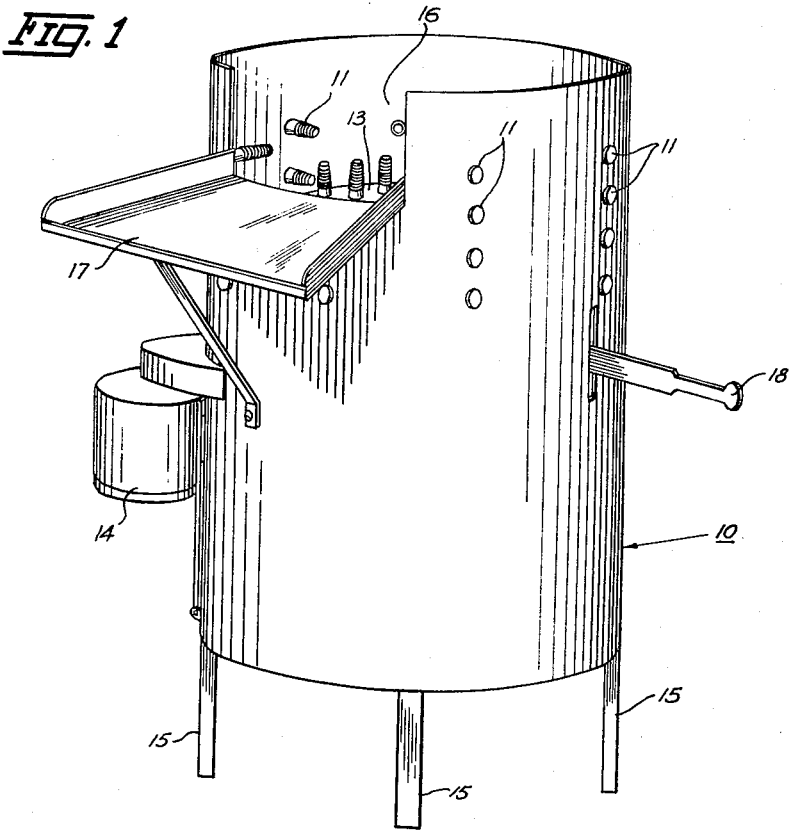
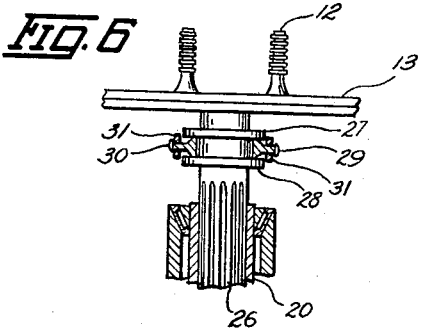
INVENTORS.
FREDERICK C. COREY
FLOURNOY COREY
BY
*Flournoy Corey*
ATTORNEY.

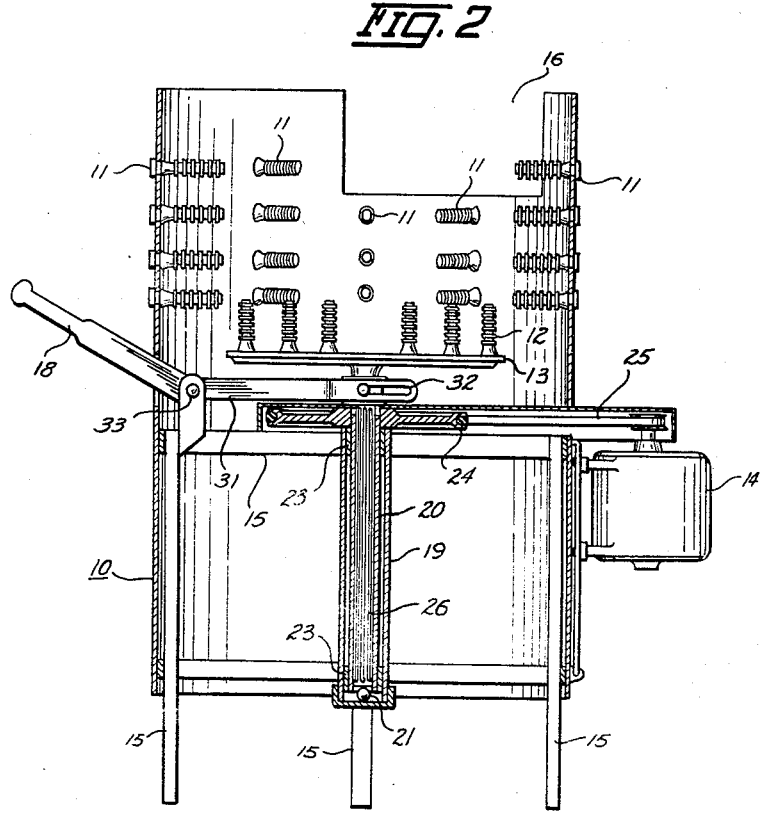
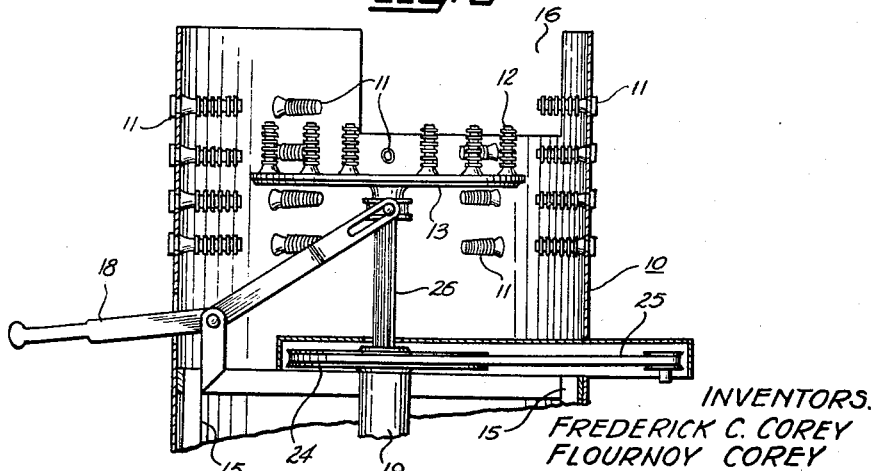

March 22, 1960    F. C. COREY ET AL    2,929,096
POULTRY PROCESSING EQUIPMENT
Original Filed June 27, 1955    3 Sheets-Sheet 3

INVENTORS.
FREDERICK C. COREY
FLOURNOY COREY
BY *Flournoy Corey*
ATTORNEY.

United States Patent Office 2,929,096
Patented Mar. 22, 1960

2,929,096
POULTRY PROCESSING EQUIPMENT

Frederick C. Corey and Flournoy Corey, Cedar Rapids, Iowa, assignors to Pickwick Company, Cedar Rapids, Iowa, a corporation of Iowa Original application June 27, 1955, Serial No. 518,112, now Patent No. 2,866,226, dated December 30, 1958. Divided and this application May 21, 1958, Serial No. 740,177

2 Claims. (Cl. 17—11.1)

This invention relates to a defeathering machine and more particularly to a disc-type machine in which the position of the disc or discs may be varied at will.

This is a division of United States application Serial No. 518,112, filed June 27, 1955, now Patent No. 2,866,226, issued Dec. 30, 1958.

A disc picker includes a vertical shell or housing which forms a chamber. Within this chamber is a power revolving disc having a plurality of upwardly extending rubbing members or feather removing means thereon. The chamber walls adjacent the disc are provided with a plurality of similar feather removing members mounted in the wall and extending inwardly towards the disc.

The fowl to be picked is placed in this chamber formed by the disc and walls, and the relative movement between the rotating rubbing members and the fixed rubbing members causes the feathers to be removed from the bird.

This invention is directed particularly to means for altering the height of the rotating disc, the principal object being to elevate the bird to cause its ejection from the machine at the completion of the defeathering operation.

A second object is to permit the bird to be brought into contact with a second rotating disc positioned immediately above the first rotating disc.

Additional defeathering capacity can be secured by positioning the birds in the chamber between two discs rotating in opposite directions. It is therefore another primary object of our invention to provide a device in which the relative spacing between the two opposed discs may be varied to accommodate different sizes of fowl by moving either or both discs vertically.

It is a still further object of our invention to provide a device whereby the upper rotating disc can be moved vertically to vary its distance above a fixed lower disc.

It is yet another object of our invention to provide a device in which each rotating disc may be separately powered at differing speeds.

It is still a further object of our invention to provide a device in which movable discs may be locked in intermediate positions.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 1 is a view in perspective of a disc-type picker showing the lever which operatively positions the disc at varying heights.

Figure 2 is a view in cross section showing a disc picker in which the single disc may be elevated to bring a fowl in registry with an opening.

Figure 3 is a view in cross section of the device shown in Figure 2, in which the disc is fully elevated.

Figure 6 is a view in cross section showing the collar means whereby the disc may be moved while in rotation.

Figure 4:
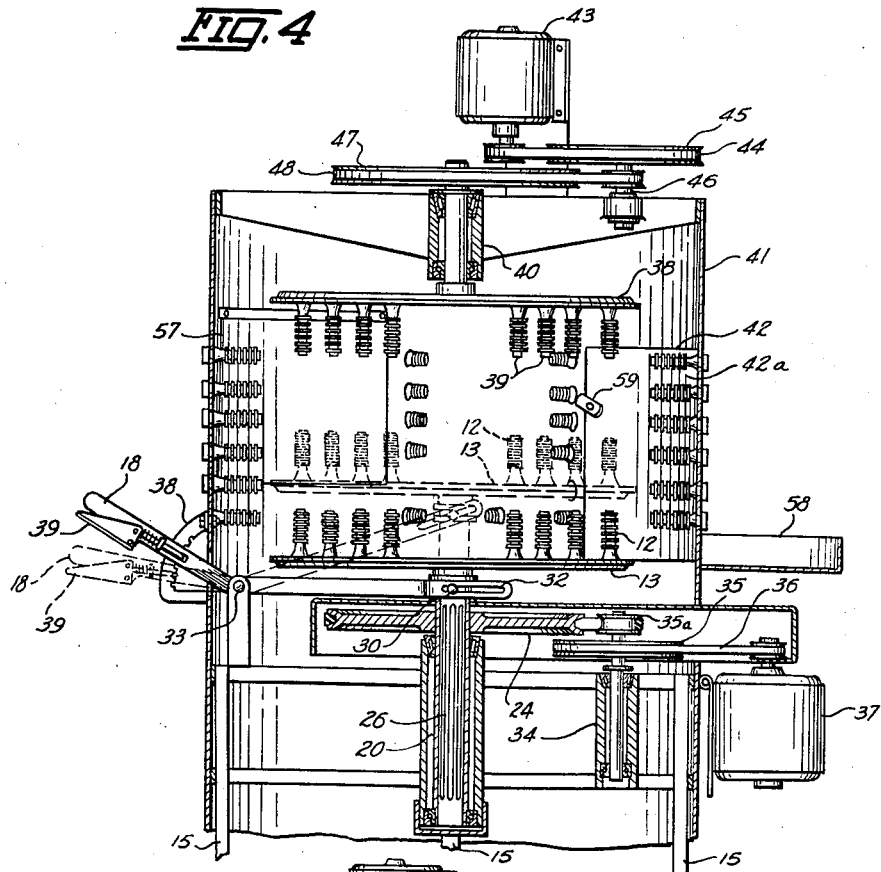
Figure 4 is a view in cross section showing an upper and lower disc, the lower disc being adapted to be elevated, its uppermost position being shown in dotted lines.

Referring now to the drawings, and more particularly to Figure 1; a disc picker constructed according to our invention comprises a main casing or housing 10 which has a plurality of rubbing members 11 mounted in the upper portion of the wall and extending inwardly into the interior of the machine.

The picking portion of the machine includes these previously mentioned rubbing members 11, and rubbing members 12 which are mounted on a powered disc 13, the power being furnished by a motor 14. The housing is mounted generally on a frame 15 and the ejection portion of the machine includes the opening 16 and the shelf 17 in the uppermost portion of the casing.

A lever 18 extends through the wall of the casing and actuates the control means whereby the disc 13 may be moved vertically within the machine.

Generally, in operation, the bird or a plurality of birds are dumped into the machine while the disc 13 is in its lowermost position and rotating. After the feathers are removed from the bird, the operator pushes the lever 18 downwardly, bringing the disc 13 upwardly to a point where the birds are in registry with the opening 16, at which point centrifugal force causes them to be thrown outwardly onto the shelf 17.

Figure 2, which is a cross sectional view of the machine shown in Figure 1, discloses in detail the operative mechanism of one embodiment of our invention. The frame 15 carries a central well or housing 19. A freely rotatable shaft 20 is carried in this housing, being supported by a ball bearing 21 at the lowermost end thereof, and bearings 22 and 23 at either end of the shaft. Fixedly attached to the top of this shaft is a pulley 24. This pulley is operatively connected to the motor 14 by a belt 25.

Within the shaft 20 is mounted a second splined shaft 26. It is this shaft on which the disc 13 is fixedly mounted, and it is this shaft which may be elevated in the manner shown in Figure 3 by the actuation of the lever 18.

Figure 5:
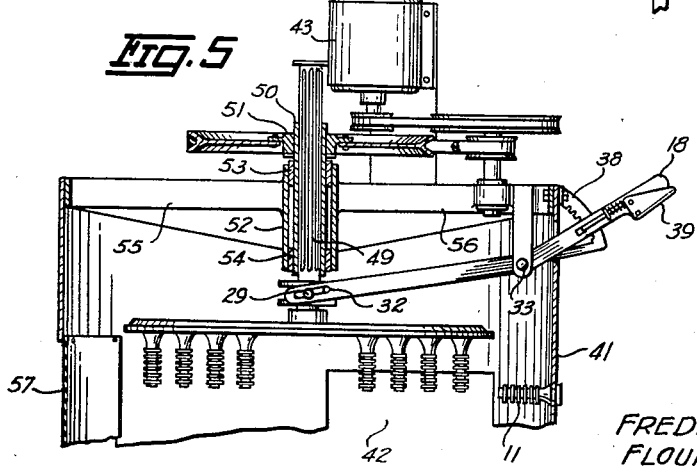
Figure 5 is a view in cross section of the upper portion of the disc picker showing means whereby the upper disc may be raised and lowered in relation to the picking machine.

To permit the free movement of the splined shaft in a vertical direction while it is in rotation, I have provided a collar 27, such as is shown in Figure 5. A yoke 28 is mounted on the collar and carries ears 29 and 30. It is these ears to which the inner ends 31 of the lever 18 are attached, the attaching portion including a slot 32 which permits the slideable movement of the yoke 28 in relation to the lever 31. The lever 18 is pivoted on the frame 15 at 33.

It will, of course, be apparent that by movement of the lever 18 in a vertical direction, a corresponding movement of the disc 13 will occur.

Referring now to Figure 4; we shall describe another embodiment of our invention in which the principle of a revolving disc is used to remove the feathers from poultry and the like, the picking action being accomplished between two opposed discs within the chamber member. In this figure, the lower disc 13 is mounted and driven in somewhat the same manner as the device shown in Figure 2, except this version of the device is provided with an intermediate jack shaft 34 which allows greater reduction in speed between the main pulley 24 and the motor 37. The elevating mechanism is similar to that shown in Figure 2, except that the lever 18 is adapted to lock in various positions. This locking action is achieved by means of a ratchet sector 38 and a spring-loaded locking means 39.

Referring again to Figure 4; disposed immediately above this lower movable disc is a second disc 38 which has a plurality of downwardly extending rubbing members 39. This disc is mounted on a shaft 40 which in turn is positioned in the center of the housing 41. Formed in one portion of the housing is an opening 42 which is provided with a door 42a. The upper disc 38 and shaft are powered by a second electric motor 43 which drives a belt 44, a pulley 45 which is mounted on a shaft 46, and operatively connected to the main drive pulley 47 by a V-belt 48. It will be understood that the upper disc may be rotated in an opposite direction in relation to the lower disc 13 in order to set up the proper picking action. It is further necessary that in addition to an opposite direction of rotation, the revolutions per minute of one disc may be somewhat higher than those of the other. This of course results in a dragging action across the surface of the fowl which are positioned in between the two discs.

Of course it will at once be apparent that poultry will vary in size and that it will be desirable to pick different types of poultry, such as turkeys, ducks and game birds, as well as chickens. Since the size of these birds differ considerably, both from each other and within their own grouping, such as hens or broilers, the spacing between the two discs must be varied to suit the requirement of the individual birds. This is obviously accomplished by raising and lowering the disc 13 as seen in Figure 4.

The dotted lines show the uppermost position of the disc while the lowermost position is shown in solid lines. It is apparent that the lever 18 may be moved in an arc and locked in any position, resulting in the lowermost disc 13 being locked in varying positions.

Still another embodiment of our invention is shown in Figure 5, in which the upper disc is adapted to be slideably positioned in relation to the main casing or housing 41. In this instance, the lever 18 has a corresponding ratchet sector, a spring loaded locking means 39, and actuates the splined shaft 49. It will be noted that this splined shaft is again mounted in a similarly splined housing 50 which is fixedly attached to a pulley 51. The housing 50 is mounted within a second housing 52 and is freely rotatable therein by reason of bearings 53 and 54. The housing 52 is rigidly mounted on plates 55 and 56 which are in turn attached to the upper portion of the casing.

It will be apparent that the mechanism shown in Figure 5 can be substituted for the upper drive mechanism shown in Figure 4, thus providing a device in which both the upper and lower discs may be positioned at different horizontal planes.

In operation of the devices shown in Figures 4 and 5, the poultry is pushed inwardly into the machine through opening 57. This opening is preferably covered by a rubber flap, so that once the poultry has been placed inside the casing, the flap will prevent the birds from being ejected. Also in this embodiment of our invention, the opening for removing the poultry is centrally located in the casing and comprises a door which may be opened by the operator at will. When this door is opened, centrifugal force will cause the birds to be ejected from the machine onto a shelf, such as is shown at 58. A latch 59 serves to hold the door in a closed position while the poultry is being defeathered.

Although we have described several specific embodiments of our invention, it is apparent that modifications thereof may be made by those skilled in the art. Such modifications may be made without departing from the spirit and scope of our invention as set forth in the appended claims.

We claim as our invention:

1. In a poultry picker, a frame, a pair of discs mounted for rotation in horizontal planes one above the other on the frame, an enclosure on said frame surrounding the discs having rubbing members for confining the birds within the area of action of the discs and retarding the movement of the birds and assisting the picking action, the lower disc having upwardly projecting rubbing members, the upper disc having downwardly projecting rubbing members, at least one of said discs being adjustable vertically to selectively vary the area and pressure relative to the bird, and separate drive means mounted on said frame for rotating the discs in opposite directions independently at different speeds to cause the circumferential movement of the bird in a fixed direction while rolling the bird simultaneously.

2. In a poultry picker, a frame, a pair of discs mounted for rotation in horizontal planes one above the other on the frame, said discs being adapted to be rotated in opposite directions, an enclosure mounted on said frame and surrounding the discs having rubbing members for confining the birds within the area of action of the discs and retarding the movement of the birds and assisting the picking action, the lower disc having upwardly projecting rubbing members, the upper disc having downwardly projecting rubbing members, at least one of said discs being adjustable vertically to selectively vary the area and pressure relative to the bird, and separate drive means mounted on said frame for rotating the discs in opposite directions independently at different speeds to cause the circumferential movement of the bird in a fixed direction while rolling the bird simultaneously.

References Cited in the file of this patent

UNITED STATES PATENTS

| Number | Name | Date |
|---|---|---|
| 337,960 | Kidd | Mar. 16, 1886 |
| 2,250,224 | Helton | July 22, 1941 |
| 2,376,376 | Moore | May 22, 1945 |
| 2,777,158 | Pitts et al. | Jan. 15, 1957 |